(12) United States Patent  
Tondar et al.

(10) Patent No.: US 7,077,282 B2  
(45) Date of Patent: Jul. 18, 2006

(54) EXPLOSION-PROOF CONTAINER

(75) Inventors: Matthias Tondar, Hausen i.W. (DE); Edgar Rehm, Weil am Rhein Märkt (DE); Thomas Boecherer, Heitersheim (DE)

(73) Assignee: Glatt GmbH, Binzen (DE)

( * ) Notice: Subject to any disclaimer, the term of this patent is extended or adjusted under 35 U.S.C. 154(b) by 403 days.

(21) Appl. No.: 10/297,217

(22) PCT Filed: May 15, 2001

(86) PCT No.: PCT/EP01/05485

§ 371 (c)(1),  
(2), (4) Date: Feb. 11, 2003

(87) PCT Pub. No.: WO01/94840

PCT Pub. Date: Dec. 13, 2001

(65) Prior Publication Data

US 2003/0146215 A1     Aug. 7, 2003

(51) Int. Cl.  
*B65D 90/36*    (2006.01)

(52) U.S. Cl. .................................... 220/89.1
(58) Field of Classification Search ............. 220/89.1, 220/89.2  
See application file for complete search history.

(56) References Cited

U.S. PATENT DOCUMENTS 3,547,298 A    12/1970   Versluis  
4,882,128 A    11/1989   Hukvari et al.
6,383,553 B1    5/2002   Tondar et al.

FOREIGN PATENT DOCUMENTS

NL              108871          7/1964

OTHER PUBLICATIONS

Drawing No. 14060800021 of Diosna Dierks & Söhne dated Jul. 28, 1998.  
Drawing No. 14060800015 of Diosna Dierks & Söhne dated Jul. 7, 2998.  
Drawing No. 14060800014 of Diosna Dierks & Söhne dated Jul. 6, 1998.  
Offer of sale by Diosna Dierks & Söhne GmbH of May 6, 1998, to Azupharma, Gerlingen, together with the apparatus list.

(Continued)

*Primary Examiner*—Stephen Castellano  
(74) *Attorney, Agent, or Firm*—Volpe and Koenig, P.C.

(57) ABSTRACT

A container (1), especially a fluidized container, including a housing upper part (2) and a housing lower part (3) is provided. The housing parts are detachably interlinked in an annular separation zone which is provided with a sealing element. The container in accordance with the invention provides that (i) the two housing parts are interlinked by coupling elements (8, 9) that engage with one another in a positive manner and that allow a limited movement in the direction of separation; (ii) the container parts are retained in a sealing position with a predetermined separation point (7) by means of a retainer (5), in which position an elastic sealing element (10) sealingly rests against the two coupling elements; and (iii) the coupling elements acts as a limiting stop when a maximum container pressure is exceeded, the predetermined separation point is activated and the housing parts are displaced towards the direction of separation.

10 Claims, 1 Drawing Sheet

OTHER PUBLICATIONS

Invoice to Azupharma GmbH dated Sep. 30, 1998.
Remanit (Thyssen Stahlwerks AG) Jun. 1989.
Nirosta 4462 (Krupp Thyssen Nirosta) Feb. 2000.
List of Features of EP 1 286 759 B1.
Brochure "Fluid-Bed Equipment CA 25 to CA 2400".
A synopsis of partial copies of the drawings 14060800015 and 14060800014 from the top view and bottom view profiles.
An agenda and the list of participants and the relation of the participants to the invited commercial enterprises.

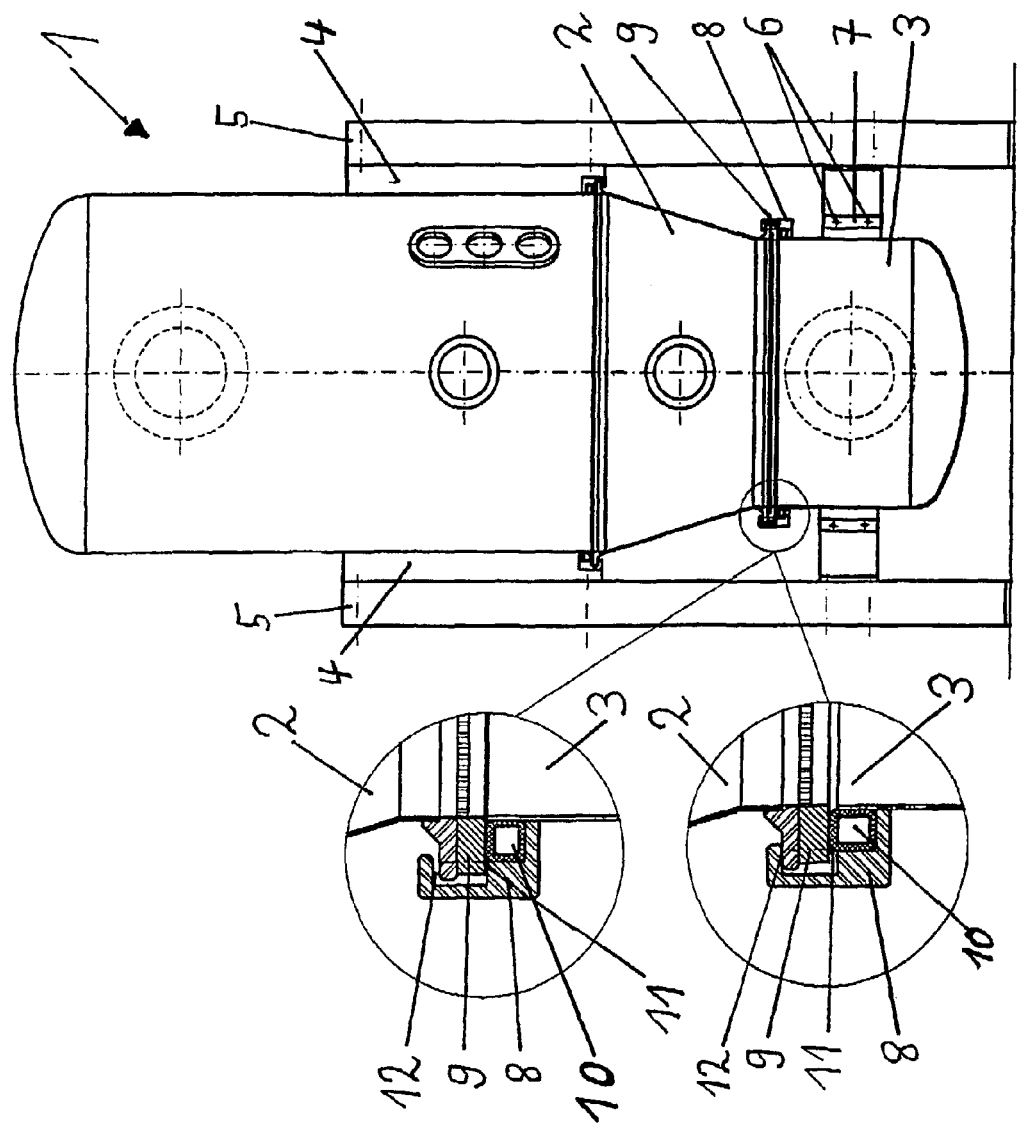

EXPLOSION-PROOF CONTAINER

BACKGROUND

The present invention pertains to a container, in particular a fluidized-bed container with an upper housing section and a lower housing section. The housing sections are connected together in a detachable ring-shaped zone of separation, and a seal is provided in this zone of separation.

Containers for chemical substances and mixtures (powders, solvents or solvent mixtures or hybrid mixtures) include reactors or fluidized-bed containers, for example. For many substances and mixtures, in particular powders, there exists the danger of explosions, for example dust explosions, during storage or, primarily, during processing.

Simple, standard reactors or containers for mixtures of substances that can be tolerated in the environment are designed merely to withstand an overpressure of 2 bar, for example. At higher pressures, e.g. in the event of an explosion, the pressure is relieved through an opening, for example upward, at a kind of design rupture point (explosion channel) and finally through the roof of a manufacturing building.

Particularly where highly active pharmacological substances are concerned (for example; hormones or substances similar to hormones; cytostatics or other anti-cancer substances such as aromatase inhibitors or Letrozole; microtubule poisons, such as Taxole, Epithilone or Discodermolide and the like; these substances are highly active even at the mg level), this form of relief is not permissible due to the danger of exposure to the environment. Here, measures must be taken to ensure that the system is closed even in the event of an explosion: existing regulations, such as VDI 2263, require that here, in case of an explosion, for example inside of a closed container such as a reactor, no exhausting of any components of the contents is permitted to the outside (e.g. through explosion channels). On the other hand, it is permissible for the container to deform.

In these closed systems, it is therefore required that there must be the ability to withstand pressures of 10 bar and above (for example 12)—explosion pressures in this range occur in most of the common particulate materials (in particular dusts) in the pharmaceutical industry.

In fluidized-bed containers, for example, these high pressures are counteracted by providing containers that are relatively large with a relatively thick wall and to provide outlets with fast-closing devices as necessary (for example as described in DE 31 37 116), which seal off the container in the event of an explosion, requiring the container walls to absorb the explosion pressure (these walls being relatively thick and consequently resulting in high weights). This absorption of pressure is accomplished through the deformation of these walls.

A common design of a fluidized-bed container has the upper section rigidly fixed, whereas the lower section of a two or more sectioned container, in particular a fluidized-bed container, is mounted on sets of disk springs. In the event of an explosion, these disk springs are able to absorb deformations and to absorb the respective forces. The prior art also includes the method of designing the respective containers from the outset in such a way that the container sections are connected together by a force lock both in the normal state as well as after an explosion (for example through bolted connections of ring-shaped flanges of the sections). The disadvantage in this is the high design costs and, in particular, the considerable effort to install and adjust due to the disk springs.

SUMMARY

Accordingly, the object of this invention is to avoid these disadvantages and to provide new types of containers that can withstand an increase in internal pressure, such as explosion pressure.

This objective is met according to this invention in that the two housing sections of the container, in particular of a fluidized-bed container, are connected via coupling parts that engage one another in a form lock in the zone of separation, with the coupling parts permitting limited motion in the direction of separation. The container sections are held in the sealed position by a support having a designed break point, with the seal position being characterized by an elastic sealing element lying against the two coupling parts, and the coupling parts form a limit stop when a maximum container inner pressure is exceeded, and the designed break point is activated and the housing sections are shifted in the direction of separation.

If an increased inner pressure occurs in a container of this type, in particular because of an explosion, no leakage to the outside occurs—to the contrary, the coming together of the coupling parts at the limit stop creates an increasingly pressure-resistant seal at the coupling zone between the upper and the lower section of the container with increasing pressure. This increasing pressure-resistant seal guarantees a much better seal than the elastic sealing element provides in the normal state. The relative motion of the sections with respect to one another causes the section of the container that is connected to the support at the designed break point to separate from it there, the relative motion then allowing an enlargement of the container without the contents of the container leaking out. Complicated adjustments and installation as is the case for disk spring bases are eliminated and the deformation of the container walls is reduced or does not occur at all (in particular when using duplex steel, as explained below).

It is preferred to provide as coupling parts a retaining rim on one container section with a U-shaped cross section with its open side facing inward, and to provide on the other container section an annular flange facing outward that extends into the retaining rim, and to design the annular flange to fit between the sealing element that is located in the retaining rim and the free side-flange of the retaining rim. Also, the inner side of the free side-flange of the retaining rim and the side of the annular flange facing it form stopping surfaces that are at a distance from one another in normal operation. This is a simple design implementation of the general principle of the invention.

To this end, the upper housing section is connected rigidly to the support and the lower housing section is connected to the support through the preferably one or more connectors that make up the designed break point, in particular provided in the form of shearing elements. The combination of a rigid support of the upper section and a break-away support of the lower section ensures the stability of the container in case of an explosion, but at the same time enables the relative movement of the sections with respect to one another, with the relative motion absorbing a portion of the explosion pressure.

According to one embodiment of the invention, the shearing elements are bolts, in particular shear pins. This enables an especially simple means of installation.

It is preferred for the sealing element to be designed as an expandable hollow seal, in particular an inflatable hollow seal. The seal's ability to expand further simplifies the installation. The upper and lower sections can be connected together without pressing them together, and the compression between the container sections necessary for sealing, in particular under normal operation, is attained by inflating the seal.

A container according to the invention can for the most part be made of a common steel (except, for example, the window glass in viewing windows), for example an austenitic steel such as V2A or V4A, for example having the material numbers 1.4301, 1.4571, 1.4404 or 1.4435.

However, an especially preferred embodiment of the invention provides that at least the lower housing section, preferably both upper and lower sections, is made of duplex steel. Surprisingly, this material is excellently suited for meeting the requirements for the containers according to the invention, despite its high brittleness. In general, this application also relates to the use of duplex steel in the manufacture of fluidized-bed containers and in general to the fluidized-bed container as such made of duplex steel, independent of the type of connection of the upper and lower section that has the advantages described below. Preferred fluidized-bed containers are those made of the duplex steels listed below as being preferred, in particular those duplex steels cited in the examples.

At this point, it should be noted that each housing section can contain other components in addition to the wall, for example inlets and outlets or sight glass ports that do not necessarily have to be made of the materials cited. Thus, "made of duplex steel" means "mostly made of duplex steel" for practical purposes, i.e. that the walls and if necessary the coupling elements are made of duplex steel. Because of their relatively small diameter, outlets and ports are less vulnerable to increased internal pressures, such as explosions, and are thus sufficiently safeguarded by proper design.

The preferred embodiment made of duplex steel has the particular advantage in comparison with embodiments using other steels in that an enormous weight reduction is possible without stability being compromised: a typical fluidized-bed container for a common amount of material to be processed, such as 120 kg in the pharmaceutical sector, with the container being made of conventional steels such as V2A steel, V4A steel or chromium-nickel steels such as steels with German material numbers 1.4571, 1.4404, or 1.4435, weighs in the neighborhood of 2,500 to 3,000 kg based on the necessary wall thicknesses. If, on the other hand, duplex steel is used according to the invention, 1,750 kg of weight suffices with an otherwise identical container design, with the weight reduction being attained through a thinner wall thickness. This is a weight reduction of about one third. Nevertheless, sufficient tensile strength exists, as does a high resistance to elongation, a suitable elastic limit and a sufficient ultimate strength, as well as it ability to be machined and welded, which makes it easier to manufacture the container in question.

In addition to the advantages mentioned above, the weight reduction achieved by using the duplex steel makes it easier to transport the container and makes it easier to stay within static requirements when it is set up since there is less load on the foundation as a result of the use of duplex steel according to the invention. Since fluidized-bed drying, granulation, and coating processes need to be performed on one of the upper floors of the building (when used inside of a building), if possible, in particular in more modern pharmaceutical production facilities using vertical production concepts, this lower foundation load is especially advantageous. Thus, for example, it is also possible to perform retrofits to fluidized-bed facilities made of duplex steels in pre-existing buildings having existing industrial foundations that are not specially reinforced, such foundations usually permitting a static surface load of around 1,000 kg/m$^2$, without requiring the foundation to be reinforced at the point of installation.

A container is preferred in which the upper housing section and/or the lower housing section and preferably even the shearing elements and/or the support are made of duplex steel.

The individual terms used above and which follow are preferred to have the meanings given below in connection with this application, unless otherwise indicated:

Containers are, in particular, reactors or fluidized-bed containers such as those used in industrial pharmaceutical facilities, for example, and in the food or agro industries.

An upper housing section can be constructed in one or more parts (for example, in case of a fluidized-bed container this can involve from bottom to top an expansion chamber and a filter chamber). The coupling between the individual components of a multi-part upper section can be done using standard methods (for example bolted connections of round flanges located on the exterior) or by using a coupling according to the invention.

The lower housing section is understood to be preferably a material container (also called a loading basin) of a reactor or in particular of a fluidized-bed dryer.

There is no need to further explain that the terms "upper section" and "lower section" do not necessarily mean that the container in question must be positioned vertically during use—it can also lie or be arranged at an arbitrary angle so that the terms "upper section" and "lower section" refer merely to the relative positions of the sections. However, the positioning of the container in an approximately or, in particular, completely vertical position constitutes a preferred embodiment of the invention, in particular for fluidized-bed containers according to the invention.

Ring-shaped means in particular having an essentially round cross section, in particular circular, but can also stand for cross sectional shapes that deviate from the circular shape (oval, ellipse, multi-cornered).

The seal is in particular one that guarantees an outward seal during normal operation (without a large overpressure in the container).

A form locked connection does not mean that the coupling parts that engage one another are connected together without play, i.e. it does not mean that they guarantee in and of themselves a seal during normal operation. To the contrary, the coupling must in particular be designed such that the upper and lower sections can move with respect to one another both radially and, more importantly (with respect to the longitudinal axis of the container that passes through the upper and the lower section), approximately axially (the latter direction is the preferred meaning of "in the direction of separation") by one or more millimeters, in particular 2 to 20 mm, preferably 5 to 7 mm. This facilitates a movement "in the direction of separation" (during an increase in pressure, such as in the case of an explosion within the container).

Coupling parts can include, preferably, combinations of flanges and retaining rims that contain the flanges; preferred are in particular a retaining rim provided on one container section (preferably the lower section) with a U-shaped cross section and with its open side facing inward, and an annular flange provided on the other container section (preferably the lower section) facing outward that extends into the retaining rim. The annular flange fits in particular between a sealing element located in the retaining rim and the free side-flange of the retaining rim. The inner side of the free side-flange of the retaining rim and the side of the annular flange facing it form stopping surfaces that are spaced apart from one another in normal operation. The stopping surfaces at the free side-flange and at the annular flange do not have to be perpendicular with respect to the longitudinal axis of the container, but can also sit at an angle other than 90° with respect to the container wall. However, they are preferred to lie at an angle of approximately 90° with respect to the container wall, and preferably parallel to one another in order to facilitate as good a form lock as possible.

When the upper and lower sections move relative to one another when the internal pressure is increased (in particular through an explosion), the two stopping surfaces bring about a seal (via form lock) at a pressure sufficiently high enough to move the two sections in the direction of separation, said seal becoming more strong the higher the internal pressure becomes.

A support is understood as a supporting device that involves at least one, preferably two support elements, wherein it is preferred that the support element or elements are rigidly connected in a force lock or material lock (preferably to the uppermost part of the upper section of the container). In this way, the stability of the entire container is ensured even in case of an explosion.

A support with a designed break point is, in particular, a support which is provided at a section of the container that is connected form locked to an adjacent section via a connection according to the invention, with the connection involving coupling parts that engage one another in a form-locked manner in the zone of separation. The designed break point connects this first section of the container to the support. It is preferred that the connection between the support and the container section be accomplished using shearing elements. In the event of an increased internal pressure, such as in case of an explosion in the container, the container section that is connected to the support via the designed break point, in particular through shearing elements, moves and thereby separates from the support. In particular, in the case of shearing elements this occurs by their breaking away from the support. The container section moves in the direction of separation until the container sections are prevented, by means of the coupling parts, from separating further. At least one (in particular the lower, less frequently the upper) of the sections of the container must be connected to the support in this way via designed break points.

Possible shearing elements include in particular lugs or (bolted or through) bolts, in particular shear pins. These are preferred to be made of common materials, in particular metals or alloys, preferably steel. In one embodiment they are made of duplex steel, but primarily of softer metals or alloys, in particular of softer steel, such as standard steel materials A2 (e.g. 1.4301, 1.4303, or 1.4306). Held in a sealed position means in particular that the support presses the container sections with sufficient pressure against one another during operation of the container to essentially maintain their position in normal operation relative to one another and to maintain the seal. The pressure necessary to accomplish this is dependent on the length of the seal and on the necessary seal pressure, and thus depends on the container size.

This can be accomplished by pressing the sections against one another, for example hydraulically, or preferably by designing (alternatively or in addition to this) the elastic sealing element between the sections such that it can produce a sufficient pressure between the sections to press the sealing element against the two sections and thus to connect them with sufficient pressure.

The elastic sealing element can be, preferably, an elastic ring made of plastic or rubber, in particular silicone. This can be hollow in the center (hollow seal) and can be filled with a gas such as air, carbon dioxide or nitrogen (i.e. filled in the operating state). "Hollow seal" means in particular that the seal is self-enclosed (tubular), but it can also be open at one end and only then form an air seal cavity when it contacts the adjacent material of the upper or lower part (for example parts of the coupling). A hollow seal of this type also includes one or more valves that are preferred to be accessible externally in the installed state.

It is preferable for the elastic sealing element to be formed such that, in the event of a movement of the upper and lower sections relative to one another in the direction of separation (for example caused by an increase in pressure in the interior of the container), it can follow the flange far enough to maintain a sealed connection during the transition to the seal via the consequent contact of the stopping surfaces of the coupling parts (bulging).

Particularly preferred as a sealing element is an expandable seal ring, in particular an inflatable and tubular seal ring, in particular a hollow seal (with one, and if desired multiple air chambers) made of elastic material, in particular made of a plastic or a rubber material, preferqably silicone, having a sufficient wall thickness, e.g. a few millimeters, for example 4 to 7 mm. This expandable seal ring facilitates the buildup of the contact pressure corresponding to the desired weight used to press the parts against one another after the upper and lower sections are fastened to the support. This is accomplished by expanding the seal ring, in particular pneumatically (through inflation) without having to push the upper and lower sections together (e.g. hydraulically) during the installation of the container. Preferred inflation pressures are from 3 to 15 bar, in particular between 3 and 12 bar.

A sealing element of this type can handle normal operating pressures with no problem, but would not be able to also handle the pressure that is necessary to hold the upper and lower sections together in case of an explosion in the container.

Preferably, the elastic sealing element is positioned so that it leaves a minimal gap between the coupling part on the upper section and that on the lower section; in the preferred form of the invention described above with the annular flange and the retaining rim as the coupling elements. This gap is between the fixed flange of a retaining rim on one element and the annular flange on the other element. This gap can be in the range of a few millimeters in width, and is preferably 1 mm or less.

On the other hand, the elastic sealing element is in direct contact in normal operation with the two flanges (providing an abutting seal).

A maximum container internal pressure is exceeded, for example, when an internal pressure exists in the container of more than two bar, in particular 5 or more bar, 10 or more bar, for example from 10 to 15 bar, and above all from 10 to 12 bar, as a result of an explosion in the interior.

In this case, the upper and the lower sections move away from one another in the direction of separation until they reach the limit stop that is created by the coupling parts.

At the same time, the connection of the container section at the designed break point to the support is shifted as a result of its motion, in particular when a shear element is broken away.

This combination of a shift of the connection from the designed break point and the movement of the coupling parts until they reach the limit stop acts to absorb a portion of the explosion energy and also creates a self-strengthening seal as the pressure increases, created by the contact at the stopping surfaces. Both of these features together facilitate the construction of containers that can meet the requirements explained above with regard to explosion stability.

Duplex steel is a steel that is both ferritic as well as austenitic. A preferred duplex steel contains, by weight fraction, 4.5 to 6.5% Nickel, 21 to 25% Chromium, 0.3 to 3.5% Molybdenum, no more than 0.03% Carbon, 0.08 to 0.20% Nitrogen and, in addition to possible traces of common impurities, Iron in the amount of the difference from 100%.

"Traces" means that, in particular, less than 0.1%, preferably less than 0.02% of the material exists as impurities.

Particularly preferred is a duplex steel that contains, by weight fraction, 4.5 to 6.5% Nickel, 21 to 23% Chromium, 2.5 to 3.5% Molybdenum, no more than 0.03% Carbon, 0.08 to 0.20% Nitrogen and, in addition to possible traces of common impurities, Iron in the amount of the difference from 100%.

In the description of the objects of the invention above and in the following description, the above terms can be replaced individually, partially or altogether by the appropriate specific definitions, which then leads to preferred embodiments of the invention.

BRIEF DESCRIPTION OF THE DRAWINGS

The following preferred embodiment serves to illustrate the invention without the intent of limiting its scope:

The invention is described below with its essential details with reference to the drawings.

Shown are:

FIG. 1 is a cross section of a container (1) (shown here as a fluidized-bed container), FIG. 2 is a cross section of the coupling area in the normal operating state, and FIG. 3 is a cross section of the coupling area after an increase in internal pressure, for example after an explosion.

DETAILED DESCRIPTION OF A PREFERRED EMBODIMENT

FIG. 1 shows a partial view of a container 1 (designed here as a fluidized-bed container) made here of a duplex steel with the German material number 1.4462 (alternatively it could also be made of a steel with the material numbers 1.4362, 1.4418, 1.4460, or 1.4410, or other steels). The container has a two-part upper section 2 in this case which is rigidly connected to a support 5 through fasteners 4, and a lower section 3 that is connected to the support 5 via the shearing elements 6, which in this case are a shear pins, which are the designed as break points 7.

The upper and lower sections are connected (and in this case also the two parts of the upper section) using the coupling elements 8 and 9 shown in FIGS. 2 and 3 in cross section, in this case provided as a retaining rim 8 and as an annular flange 9.

FIG. 2 shows a cross section of the coupling area 8, 9 in normal operational condition (no increase in pressure): the sealing element 10, designed here as a hollow seal and preferably made of silicone, seals the inner space from the gap 11 so that the seal is ensured in normal operation. The hollow seal is put under pressure (3 to 15 bar) pneumatically (preferably through a valve, not shown), and presses the upper and lower sections against one another. Between the free flange of the retaining rim 8 and the annular flange 9 is a gap 12, for example of 5 mm width.

FIG. 3 shows the same section after an increase in the internal pressure, for example as a result of an explosion: the upper section 2 and the lower section 3 have moved apart as a result of the explosion pressure. Gap 11 has enlarged by the original width of gap 12, whereas gap 12 present originally during normal operation has disappeared due to the relative motion of the retaining rim 9 and the annular flange 8.

The two surfaces of the free flange of the retaining rim and of the annular flange pressed against one another as a result of the explosion pressure together form a support and a seal created by their form-lock, with the seal strengthening as the pressure in the container interior increases. The hollow seal (10) here is also so deformed by its inner pressure and e.g. also by the lateral pressure from the container so that it continues to provide a seal—by itself, however, it would not be able to withstand the pressure.

Not shown is that the shear pins 6 are broken off after the explosion: the lower section then only continues to hang from the container upper section by virtue of the coupling to the upper section, which is fixed rigidly in the support.

The invention claimed is:

1. An, explosion-proof fluidized-bed container (1), comprising an upper housing section (2) and a lower housing section (3), said housing sections being connected together in a detachable ring-shaped zone of separation, and a seal is located in the zone of separation, wherein: (i) the upper and lower housing sections are connected via coupling parts (8), (9) that engage one another in a form locking manner in the zone of separation, said coupling parts permitting limited motion in a direction of separation; (ii) the container sections are held in a sealed position by a support (5) having at least one designed break point (7) including at least one shear element (6) which connects the support (5) to one of the housing sections (2), (3), the seal comprising an elastic sealing element (10) laying against the two coupling parts; and (iii) the coupling parts form a limit stop when a maximum container inner pressure is exceeded, the at least one designed break point is activated and the housing sections are shifted in the direction of separation.

2. The fluidized-bed container according to claim 1, wherein the coupling parts (8), (9) comprise a retaining rim on one of the container sections having a U-shaped cross section with an open side thereof facing inward, and on the other of the container sections, an annular flange facing outward that extends into the retaining rim; the annular flange is located between the sealing element (10) that is positioned in the retaining rim and a free side-flange of the retaining rim; and an inner side of the free side-flange of the retaining rim and a side of the annular flange facing it form stopping surfaces that are spaced apart from one another in normal operation.

3. The fluidized-bed container according to claim 1, wherein the upper housing section (2) is connected rigidly to the support (5) and the lower housing section (3) is connected to the support (5) through the at least one shearing element (6) included with the designed break point (7).

4. The fluidized-bed container according to claim 3, wherein the shearing elements are shear pins.

5. The fluidized-bed container according to claim 1, wherein the sealing element (10) comprises an expandable, inflatable hollow seal.

6. The fluidized-bed container according to claim 1, wherein at least the lower housing section (3) is made of duplex steel.

7. The fluidized-bed container according to claim 6, wherein at least the upper housing section (2) and the lower housing section (3) and optionally, shear elements (6) that comprise the designed break point and/or the support (4), (5) are made of duplex steel.

8. The fluidized-bed container according to claim 6, wherein the duplex steel contains, by weight fraction, 4.5 to 6.5% Nickel, 21 to 25% Chromium, 0.3 to 3.5% Molybdenum, no more than 0.03% Carbon, 0.08 to 0.20% Nitrogen and, in addition to possible traces of common impurities, Iron in the amount of the difference from 100%.

9. The fluidized-bed container according to claim 6, wherein the duplex steel contains, by weight fraction, 4.5 to 6.5% Nickel, 21 to 23% Chromium, 2.5 to 3.5% Molybdenum, no more than 0.03% Carbon, 0.08 to 0.20% Nitrogen and, in addition to possible traces of common impurities, Iron in the amount of the difference from 100%.

10. An explosion-proof fluidized-bed container (1) comprising an upper housing section (2) and a lower housing section (3), said housing sections being connected together in a detachable ring-shaped zone of separation, and a seal is located in the zone of separation, wherein: (i) the upper and lower housing sections are connected via coupling parts (8), (9) that engage one another in a form locking manner in the zone of separation, said coupling parts permitting limited motion in a direction of separation; (ii) the container sections are held in a sealed position by a support (5) having at least one designed break point (7) which connects the support (5) to one of the housing sections (2), (3), the seal comprising an elastic sealing element (10) laying against the two coupling parts; and (iii) the coupling parts form a limit stop when a maximum container inner pressure is exceeded, the at least one designed break point is activated and the housing sections are shifted in the direction of separation, wherein the sealing element (10) maintains a seal between the coupling parts (8), (9) throughout a range of travel defined by the limit stop, whereby the container remains sealed when the maximum container inner pressure is exceeded and the designed break point is activated.

* * * * *